July 16, 1935.  D. E. MARSHALL ET AL  2,008,399
ARC BACK RELAY
Filed March 30, 1934
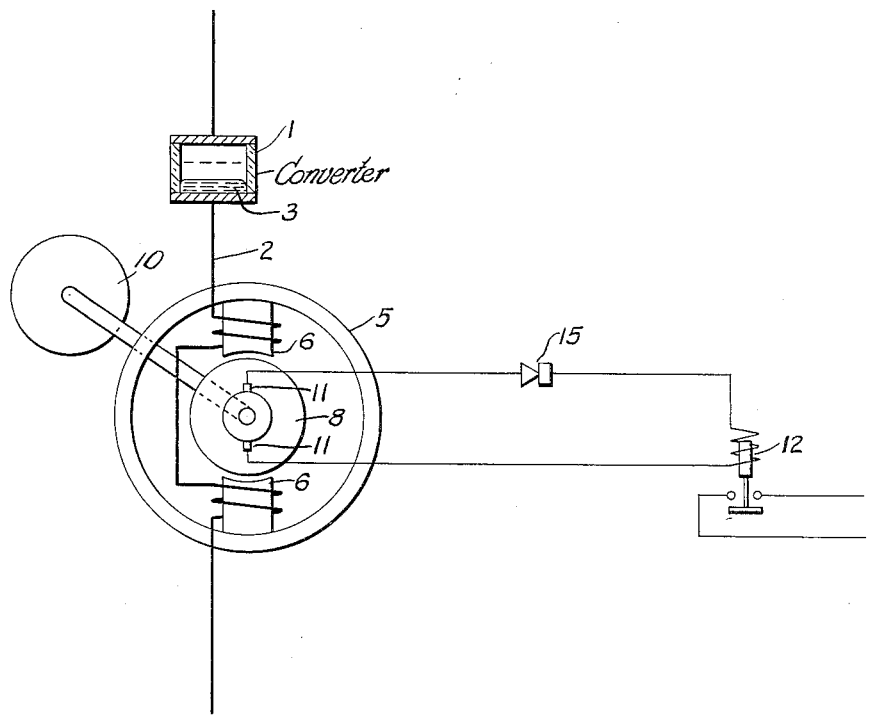
WITNESSES:
INVENTORS.
Donald E. Marshall and
Daniel Silverman.
BY
ATTORNEY

UNITED STATES PATENT OFFICE 2,008,399

ARC BACK RELAY

Donald E. Marshall, Pittsburgh, and Daniel Silverman, Wilkinsburg, Pa., assignors to Westinghouse Electric & Manufacturing Company, East Pittsburgh, Pa., a corporation of Pennsylvania Application March 30, 1934, Serial No. 718,266

4 Claims. (Cl. 175—294)

Our invention relates to a protective relay and particularly to a relay responsive to arc backs in a vapor electric converter.

Vapor electric converters such as mercury arc rectifiers are subject to temporarily reverse currents known as arc backs or backfires. On the occurrence of such a backfire, it is necessary to actuate suitable protective equipment usually in the form of circuit breakers to terminate the reverse current flow in the converter.

Arc back or backfire is usually detected by means of reverse current relays connected in one of the uni-directional leads, usually the cathode lead, of the converter. Arc back responsive devices heretofore constructed have had a serious disadvantage in that they frequently indicated an arc back on the sudden change, particularly dropping load.

It is, therefore, an object of our invention to provide an arc back responsive device which will operate only in the event of actual reverse current flow in the uni-directional lead to which it is connected.

According to our invention, a direct-current generator is connected in the uni-directional current lead in such a manner that the current flow in the lead provides the field excitation for the direct-current generator. Preferably, this is done by providing several turns around the field poles of a suitable direct-current machine. The direct-current output of the generator is connected through the actuating coil of a suitable relay. The current flow through the relay coil is then controlled by means of a suitable uni-directional conductor which prevents current flow on normal polarity of the potential generated in the direct-current generator but allows current flow on reversal of the polarity of the generated potential. As is well known, the polarity of the fields will vary with the intensity of the current passing through the field coils but will not be reversed until the direction of current flow has been reversed.

Other objects and advantages of our invention will be apparent from the following detailed description taken in conjunction with the accompanying drawing, in which the figure is a schematic illustration of a reverse current relay embodying our invention.

The apparatus according to our invention comprises a current rectifying device such as a mercury arc converter 1 having a direct-current bus 2 connected to one of the terminals 3 of the converter. This direct-current bus 2 is associated with a direct-current generator 5 in such a manner that the polarity of the field poles 6 of the generator is determined by the direction of current flow in the uni-directional bus 2.

The armature 8 of this machine is constantly rotated by a suitable motor 10, so that the potential generated in the rotating armature is responsive to the current flowing in the uni-directional conductor.

The direct-current brushes 11 of the armature 10 are connected to the actuating coil 12 of a suitable relay which may be used for operating any suitable control devices. Connected in series with the actuating coil 12 of the relay is a suitable uni-directional conductor such as a copper oxide rectifier 15.

In the operation of our device, the normal current flow in the series coil on the field of the direct-current generator will produce a normal polarity of the potential generated therein. The rectifying element is provided for preventing current flow because of this normal potential.

However, if a reverse current occurs in the uni-directional conductor 2, the polarity of the field 6 of the direct-current generator will be reversed, and the polarity of the output potential will also be reversed. The auxiliary rectifier will now operate to permit current to flow through the actuating coil of the relay and close the contacts of the control circuit. While any desired type of direct-current machine can be used, we have found that a very small direct-current generator having a normal potential of approximately 6 volts is quite satisfactory for the service for which it is intended.

We have found that in practice the device is quite insensitive to the amount of reverse current as any current sufficient to reverse the polarity of the field will produce sufficient current to actuate the relay.

While we have shown and described a specific embodiment of our invention, it will be apparent that changes and modifications can be made therein without departing from the true spirit of our invention or scope of the accompanying claims.

We claim as our invention:

1. A protective relay for a vapor electric converter comprising a direct-current generator the polarity of which is dependent upon the direction of current flow in the converter, a relay element connected to said generator and a uni-directional conductor in series with said relay element, said uni-directional conductor being operative on reverse current flow in the converter to allow current flow to said relay element.

2. A protective device for a mercury-arc rectifier comprising a dynamo-electric machine having its field excited by the direct-current bus of the rectifier, a relay connected to the armature of the machine and an auxiliary rectifier for controlling current flow to said relay.

3. A reverse current relay for a uni-directional current circuit comprising a direct-current generator, a field winding in said generator connected in series with the uni-directional circuit, a relay connected across the armature of the generator and a uni-directional conductor for preventing operation of the relay for normal polarity of potential in said generator.

4. A reverse current relay for a mercury arc rectifier comprising a dynamo-electric machine, a laminated field structure in said machine, a field winding on said field structure, said field being in series with a uni-directional conductor of said rectifier, a direct-current armature associated with the field structure, a relay having its actuating coil connected across the armature and an auxiliary rectifier for controlling current flow from said armature to the relay coil.

DONALD E. MARSHALL.
DANIEL SILVERMAN.